United States Patent [19]

Nakajima

[11] Patent Number: 4,570,878
[45] Date of Patent: Feb. 18, 1986

[54] CLUTCH AND BRAKE FOR A FISHING REEL

[75] Inventor: Hideki Nakajima, Sakai, Japan

[73] Assignee: Shimano Industrial Company Limited, Osaka, Japan

[21] Appl. No.: 690,403

[22] Filed: Jan. 10, 1985

Related U.S. Application Data

[63] Continuation of Ser. No. 469,720, Feb. 25, 1983, abandoned.

[30] Foreign Application Priority Data

Mar. 3, 1982 [JP] Japan .............................. 57-30866[U]
Mar. 26, 1982 [JP] Japan .............................. 57-43318[U]

[51] Int. Cl.⁴ ............................................. A01K 89/02
[52] U.S. Cl. .............................. 242/220; 242/84.5 R; 242/84.53
[58] Field of Search ...................... 242/84.1 R, 84.5 R, 242/84.51 R, 84.53, 212, 217–221

[56] References Cited

U.S. PATENT DOCUMENTS

| | | | |
|---|---|---|---|
| 2,478,111 | 8/1949 | Kilian | 242/84.5 R |
| 2,536,583 | 1/1951 | Tank | 242/221 |
| 3,268,182 | 8/1966 | Clark | 242/221 |
| 4,281,808 | 8/1981 | Noda | 243/218 |

Primary Examiner—Billy S. Taylor
Attorney, Agent, or Firm—Stevens, Davis, Miller & Mosher

[57] ABSTRACT

A fishing reel which comprises a spool carried by a spool shaft rotatably supported between a first and second side frames, a driving mechanism for driving the spool shaft, a clutch mechanism for controlling the coupling and uncoupling of the driving mechanism with the spool shaft, and a clutch control mechanism for operating the clutch, each provided at the first side frame respectively, a rotary member provided at the spool at the first side frame side to be rotatable together with the spool, a contact member provided at the first side frame to contact with and depart from the rotary member so that the contact member contacts with the rotary member to apply a rotational resistance to the spool, and an operation mechanism provided at the first side frame for operating the contact member to be in a contacting position and departing position with respect to the rotary member, so that when the spool freely rotates, a desired resistance can be easily applied to the free rotation of the spool.

5 Claims, 10 Drawing Figures

CLUTCH AND BRAKE FOR A FISHING REEL

This application is a continuation of application Ser. No. 469,720, filed Feb. 25, 1983, now abandoned.

FIELD OF THE INVENTION

The invention relates to a fishing reel, and more particularly to a fishing reel which comprises a reel body having a first and second side frames, a spool rotatably supported between the side frames, a driving mechanism for driving the spool, and a clutch mechanism for making the spool freely rotatable. The fishing reel is mainly fit for lure fishing.

BACKGROUND OF THE INVENTION

Generally, this kind of fishing reel includes a clutch control mechanism which is operated to engage a clutch mechanism, so that a driving force through rotation of a handle is transmitted to the spool shaft through the clutch mechanism and driving mechanism, thereby winding a fishing line onto a spool supported to a spool shaft, while the clutch mechanism can also be operated to disengage so as to allow the spool shaft to freely rotate, so that the fishing line can be cast through a free rotation of the spool by a casting operation. Even when the clutch mechanism is set in engagement for winding a fishing line, the spool is allowed to also rotate reversely under a predetermined rotational resistance set by a drag mechanism having a friction plate included in the driving mechanism, so that the fishing line can be drawn out from the spool through a pull force applied to the fishing line at that time.

There are two generally employed fishing techniques. In one of them, after the casting operation, the angler allows the clutch mechanism to be set in engagement for the fishing line wind-up phase to wait for a pull of fish. In the other, after the casting operation, the angler allows the clutch mechanism to be set in engagement and removes slack of the fishing line by rotating the handle, thereafter, allowing the clutch mechanism to be set in disengagement so as to set the spool in a free-rotation phase as he waits for a pull of a fish.

But, in the latter case with the spool in the free rotation phase, the fish when caught acts to draw out the fishing line from the spool without any resistance. Hence, conventionally, the angler does, for example, touch the spool with his thumb, so-called thumbing, so as to apply a resistance to the spool in free rotation, thereby slowing the speed drawing-out of the fishing line. However, the thumbing technique requires skill, and it is difficult to have a good timing for the thumbing operation.

Particularly, when fishing for black bass by use of a lure such as, for example, a plastic worm, usually the spool is first set in the fishing line wind-up phase. When the black bass takes the plastic worm and the angler feels a pull of the fish, he operates the clutch control mechanism to set the clutch mechanism in disengagement so as to allow the spool to be freely rotatable. Simultaneously, the angler performs the thumbing operation by fitting his thumb to the spool so as to apply thereto a predetermined rotational resistance. In this instance, operation of the thumbing requires an extremely good technique. In particular, a beginning angler cannot accurately and properly perform the thumbing, causing a backlash of fishing line, or an excessive rotational resistance to be applied to the spool so that the fishing line is not smoothly fed out, making it likely that the fish is prevented from gulping the worm.

SUMMARY OF THE INVENTION

This invention has been designed to overcome the aforesaid problems. The main object of the invention is to provide a fishing reel by which any angler without skill can easily apply a resistance to the spool in free rotation phase when the fish is caught. Another object of the invention is to provide a fishing reel wherein when the spool rotates through a pull on the fishing line by the fish, a generated sound can draw the angler's attention to the rotation of the spool. In detail, the invention is so constructed that a reel body comprises a first and second side frames; a spool is rotatably supported between the side frames; the first side frame is provided with a driving mechanism for driving the spool, a clutch mechanism for setting the spool freely rotatable, and a clutch control mechanism; a rotary member is provided in association with the spool at the first side frame side to be rotatable together with a spool shaft supporting the spool; a contact member is provided at the first side frame to contact with and depart from the rotary member, so that the contact member contacts with the rotary member to apply a resistance to rotation of the spool shaft; and an operation mechanism is provided at the first side frame for controlling the contact member between its contacting position and departing position with respect to the rotary member.

The rotary member is provided at its outer peripheral surface with a number of ridges and grooves, and the contact member is formed as a pawl engageable with the ridges and grooves, so that the contact member contacts with the rotary member to apply a rotational resistance to the spool shaft and to simultaneously generate a sound.

In addition, the operation mechanism for the contact member, when made in association with the clutch control mechanism, can set the clutch mechanism in disengagement so as to set the spool in free rotation, and to simultaneously apply a resistance to the free rotation of the spool.

In other words, the invention is characterized in that the contact member is operated to contact with the rotary member so as to apply a resistance to the rotation of spool shaft and spool, so that the fishing line can be drawn out from the spool under an appropriate resistance without causing a backlash through a simple operation merely by controlling the operation mechanism. Hence, even a beginning angler can easily fish.

Additionally, the rotary member and contact member serve as a sound generator, so that the angler can quickly and ensurely perceive through the generated sound the fish's pull on the fishing line, while the spool shaft and the spool are given the appropriate resistance.

Furthermore, the operation mechanism is provided at the first side frame to which the driving mechanism and clutch control mechanism are mounted, so that the contact member is readily operated to contact with and depart from the rotary member by the same hand of the angler as that controlling the handle of the driving mechanism and the clutch lever of clutch control mechanism.

These and other objects and novel features of the invention will become more apparent upon a reading of the following detailed specification in conjunction with the drawings.

DETAILED DESCRIPTION OF THE INVENTION

Figure 1:
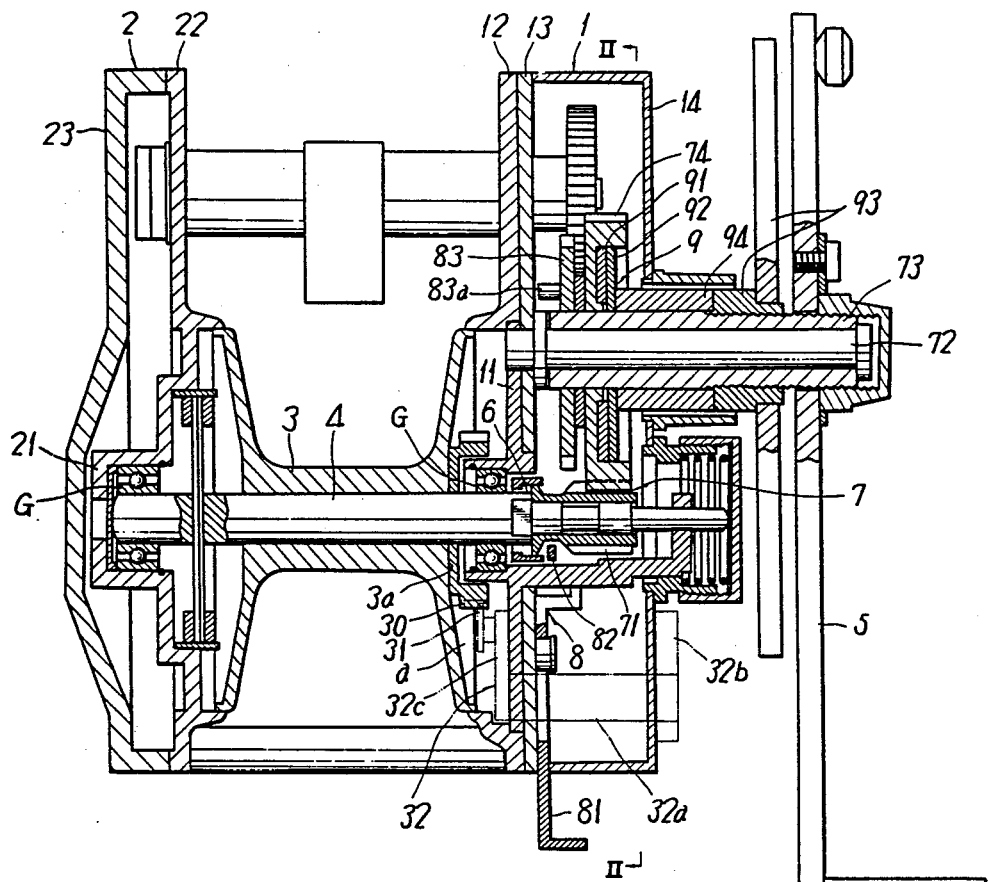
FIG. 1 is a transversely sectional plan view of an embodiment of fishing reel of the invention.

Referring to the drawings, reference numerals 1 and 2 designate a pair of first and second side frames spaced from each other at a regular interval, these two frames costituting a reel body. The first side frame 1 comprises a side plate 12 having at the center a bearing housing 11, an attached plate 13 attached outside the side plate 12, and a cup-shaped cover 14 attached outside the attached plate 13. While, the second side frame 2 comprises a side plate 22 integrally having at the center a bearing housing 21, and a cup-shaped cover 23 attached outside to the side plate 22.

A spool shaft 4 having a spool 3 is rotatably supported between the first and second side frames 1 and 2 through a pair of bearings G, so that when a handle 5 constituting a part of a driving mechanism 7 is operated to rotate, a driving force therefrom is transmitted to the spool shaft 4 through a clutch mechanism 6 so as to drive the spool 3. While, a clutch lever 81 of a clutch control mechanism 8 is operated to set the clutch mechanism 6 to be in engagement and disengagement. The driving mechanism 7 includes a drag mechanism 9 having a friction plate 91.

The driving mechanism 7 comprises a pinion gear 71 rotatably and slidably supported to one end of the spool shaft 4 which projects at the one end into the first side frame 1, a handle shaft 73 rotatably supported between the attached plate 13 and the cover 14 through a support shaft 72, and a driving gear 74 rotatably supported to the handle shaft 73 at its projecting portion into the cover 14. Hence, the driving force due to rotation of handle 5 is transmitted to the driving gear 74 through the drag mechanism 9 supported to the handle shaft 73, and, then, transmitted to the spool shaft 4 through the pinion gear 71 and the clutch mechanism 6 provided between the pinion gear and spool shaft, thereby driving the spool 3.

The clutch mechanism 6 is so constructed that the spool shaft 4 is provided at its intermediate portion with a flat face, and the pinion gear 71 is provided with a tubular portion having a non-circular inner surface engageable with the flat face of the spool shaft. Hence, when the tubular portion of pinion gear 71 is disengaged from the flat face portion of spool shaft 4 through operation of the clutch control mechanism 8, the spool shaft 4 and the spool 3 fixed thereto can be freely rotatable.

The clutch control mechanism 8 comprises a clutch yoke 82 holding and always biasing the pinion gear 71 in the direction of setting the clutch mechanism 6 in engagement, a clutch lever 81 formed in a fork-like shape having a biasing portion for biasing the clutch yoke 82, and a return plate 83 non-rotatably supported to the handle shaft 73 and provided with a plurality of clutch pins 83a. The clutch lever 81 is mounted to the attached plate 13 of first side frame 1 to reciprocate in the direction of being at right angles with respect to the spool shaft 4, and the lever 81 is biased in the direction of its backward movement by a return spring 84.

Figure 2:
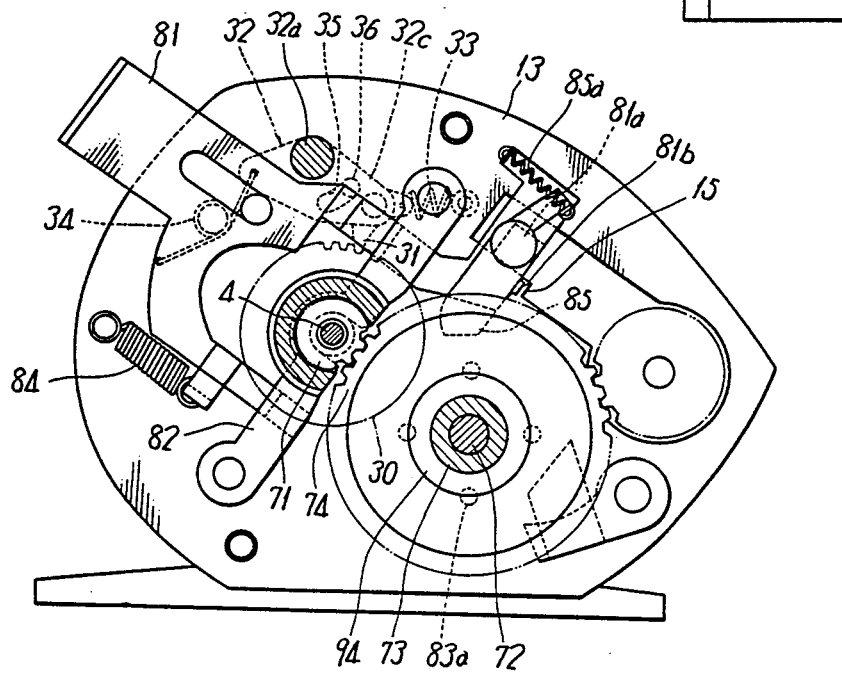
FIG. 2 is a sectional view taken on the line II—II in FIG. 1, in which the cover is removed.

The clutch lever 81 is, as shown in FIG. 2, bent in a L-like shape at its fore end, the bent portion being provided with an engaging projection 81a engageable with a cut-out stepped portion 15 provided at the attached plate 13, so that when the clutch lever 81 is positioned at its termination of forward movement, the projection 81a engages with the stepped portion 15 so as to keep the clutch lever at the abovesaid termination position.

The bent portion of the clutch lever 81 supports swingably an engaging member 85 which can contact with the clutch pins 83a so as to disengage the clutch lever 81 from the stepped portion 15. The engaging member 85 is usually press-contacted with a stopper 81b at the clutch lever 81 by a spring 85a.

In the construction just described, the clutch lever 81 is pushed to move the clutch yoke 82 axially of the spool shaft, so that the pinion gear 71 is moved in the direction of setting the clutch mechanism 6 in disengagement, while, the handle 5 is operated to rotate so as to allow the clutch pins 83a at the return plate to press-contact with the engaging member 85 swingably supported to the fore end of the clutch lever 81, so that the engaging projection 81a is disengaged from the stepped portion 15 to thereby move the clutch lever 81 backward to its initial position through the return spring 84, thereby moving through the clutch yoke 82 and the pinion gear 71 in the direction of setting the clutch mechanism 6 in engagement.

The drag mechanism 9 comprises the frictional plate 91 supported to the driving gear 74, a drag washer 92 opposite to and contacting with the frictional plate 91, a drag lever 93 provided between the drag washer 92 and the handle 5, and a tubular press member 94 interposed between the drag lever 93 and the drag washer 92. The drag washer 92 is mounted onto the handle shaft 73 axially movably but non-rotatably. The drag lever 93 is screwably mounted onto the handle shaft 73 so that the drag lever 93 is operated to rotate to allow the drag washer 92 to move axially and press-contact with the frictional plate 91, thereby transmitting the rotational force from the handle shaft 73 to the driving gear 74 through the drag washer 92 and frictional plate 91. The drag lever 93 can be operated to reduce the press-contact force of the drag washer with the frictional plate 91, in order to allow the driving gear 74 to slidably rotate with respect to the handle shaft 73.

In the fishing reel constructed as described and shown in FIGS. 1 and 2, a rotary member 30 is provided at the spool 3 at the first side frame side to be rotatable together with the spool 3. A contact member 31 engageable with the rotary member is provided inside the bearing housing 11 at the first side frame 1 so as to contact with and depart from the rotary member 30. An operation mechanism 32 for operating the contact member 31 is provided at the first side frame 1 to control the contacting and departing of the contact member 31 with respect to the rotary member 30.

The rotary member 30 shown in FIGS. 1 and 2 is formed from a gear having at its outer peripheral surface a number of teeth, and is arranged within a space a between the spool 3 and the first side frame 1 so as to be fixed to an edge surface 3a of the spool at the first side frame side by use of an adhesive or mounting means such as set-screws.

The rotary member 30 may be formed integrally with the spool 3, or may be secured to the spool shaft 4 at its projecting portion from the edge surface 3a of spool.

The contact member 31 is formed from a pawl having an engaging portion 31a engageable with teeth of the rotary member 30.

Figure 3:
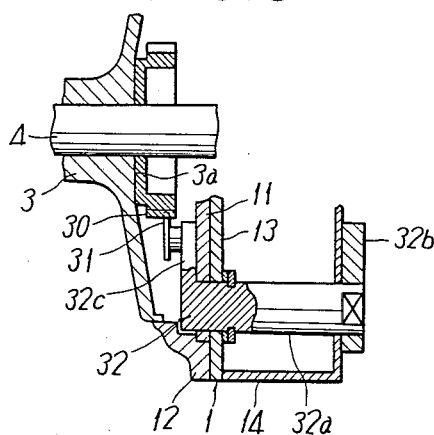
FIG. 3 is a sectional view of a principal portion of the first embodiment only.
Figure 4:
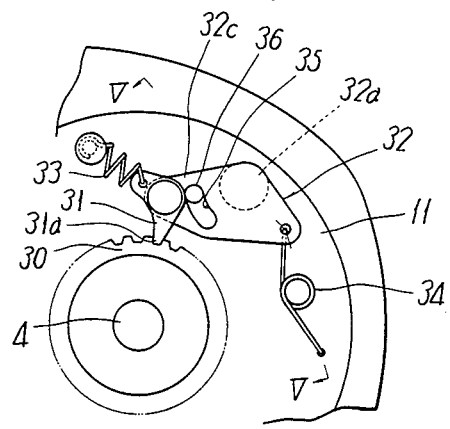
FIG. 4 is a side elevational view of the same.
Figure 5:
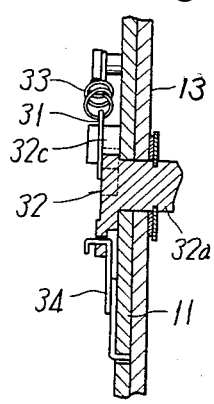
FIG. 5 is a sectional view taken on the line V—V in FIG. 4.
Figure 6:
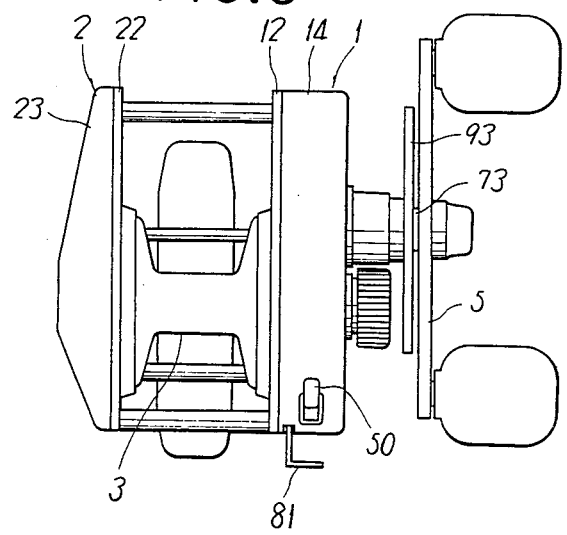
FIG. 6 is a plan view of a second modified embodiment.

The operation mechanism 32 is, as shown in FIG. 3, rotatably supported between the attached plate 13 and cover 14 at the first side frame, and comprises a control shaft 32a projecting at one end into the space a, a control lever 32b provided at the control shaft 32a at its projecting end outwardly of the cover 14, and plate-like shaped arm 32c provided to the control shaft 32a at its projecting end into the space a. The contact member 31 is pivotted to the fore end of the arm 32c so that the control lever 32b is operated to rotate for controlling the contact member 31 between the contacting position and departing position with respect to the rotary member 30. Between the control member 31 and the bearing housing 11 is provided a spring 33 as shown in FIGS. 4 and 5 and between the arm 32c and bearing housing 11 is interposed a torsion spring 34 for retaining the operation mechanism 32 at positions corresponding to the contacting and departing positions of the contact member 31 with respect to the rotary member.

A guide slot 35 is provided at one of the arm 32c and bearing housing 11, and the other is provided with a projection 36 engageable with the guide slot 35. Upon a casting operation, the clutch mechanism 6 is set in disengagement through the clutch lever 81 so as to set the spool 3 in the free-rotation phase. The control lever 32b is operated to rotate so as to disengage the contact member 31 from the rotary member 30, and the wound fishing line on the spool is cast through the casting operation. Thereafter, the handle 5 is operated to return the clutch lever 81 to its initial position so as to set the clutch mechanism 6 in engagement for the fishing line wind-up phase, and the control lever 32b is operated to rotate so as to allow the contact member 31 to contact with the rotary member 30, thereby setting the reel in the phase for applying a resistance to the spool shaft and simultaneously generating sound, and waiting for a pull of a fish. In this condition, when the fish catches the bait to thereby apply a pull force to the fishing line, the clutch lever 81 is operated to set the spool 3 to be freely rotatable, so that when the fish further pulls the bait, the spool 3 freely rotates, but in this instance, the spool is subjected to a desired resistance so as to allow the fishing line to be drawn out from the spool without causing a backlash.

When, after casting operation, the clutch mechanism 6 is set in engagement, and the handle 5 is rotated to take away a slack of the fishing line, then, the clutch mechanism is set again in disengagement so as to set the spool 3 in free rotation for waiting for the pull of a fish. In this case, the control lever 32b is operated to rotate so as to contact the contact member 31 with the rotary member 30, thereby setting the reel in the phase for applying a resistance to the spool shaft and simultaneously generating sound, and waiting for a pull of a fish. In this instance, when the fish takes the bait to apply a pull force to the fishing line, the spool 3 freely rotates, and the rotary member 30 rotates together with the spool so as to generate a sound while a desired resistance is applied to the free rotation of spool 3. In other words, when the spool is in the free rotational phase, the pull of the fishing line by fish can be quickly and ensurely perceived by the angler, while he does not need the thumbing by contacting his thumb with the freely rotating spool because the spool is subjected to a desired resistance due to the foregoing system.

Furthermore, when the reel is in the fishing line wind-up phase, the fishing line can be wound onto the spool 3 in such a manner that the handle 5 is rotated to transmit the driving force to the spool shaft 4 through the handle shaft 73, drag mechanism 9, driving gear 74, pinion gear 71 and clutch mechanism 6, thereby driving the spool 3.

In such a fishing line wind-up phase, when a larger torque than a rotational resistance through the drag mechanism 9 is applied to the spool 3 due to a pull force of the fishing line by fish, the spool 3 rotates against the rotational resistance through the drag mechanism 9, so that the rotary member 30 does, consequently, rotate reversely to generate sound as in the aforesaid case, thereby quickly and ensurely enabling the angler to perceive the pull of the fishing line by a fish caught by the hook and enabling the angler to be easily appraised of the speed of the fishing line being drawn out. In the fishing line wind-up phase, a lighter resistance can be applied for rotation of handle 5 by use of an engagement resistance between the contact member 31 and rotary member 30, thereby preventing the fishing line from being cut due to an abrupt and hasty operation of the handle.

The operation mechanism 32 is provided at the first side frame 1 supporting the driving mechanism 7 and clutch control mechanism 8, so that the operation mechanism 32, the handle 5 of driving mechanism 7 and clutch lever 81 of clutch mechanism 6 can be operated from a position at the first side frame side, thereby easily operating the operation mechanism 32 to set the contacting and departing of contact member 31 with respect to the rotary member.

In the abovesaid embodiment, contacting and departing of the contact member 31 with respect to rotary member is controlled by rotation of the operation mechanism 32. Alternatively, the operation mechanism may be arranged to move longitudinally for the abovesaid operation of the contact member.

In this first embodiment of the invention, the torsion spring 34 is employed for retaining the operation mechanism 32 at positions corresponding to the contacting and departing positions of contact member with respect to the rotary member. Alternatively, the operation mechanism may be arranged to be finely and delicately adjusted in the amount of the contacting operation. In this case, the contact member 31 can be finely and delicately adjusted in the amount of its engagement with the rotary member 30 so as to adjust the volume of the generated sound by the contact member and the amount of engagement resistance between the contact member and rotary member.

In the abovesaid embodiment, the operation mechanism 32 controls only the contact member 31 but may, alternatively, be arranged to control the disengagement of clutch mechanism 6, too. Such features are shown in FIGS. 6 through 10 as a modified embodiment, wherein the rotary member 30 is mounted to the spool shaft 4 so as to rotate together therewith the same as in the first embodiment, but, an operation mechanism 50 for the contact member 40 is different therefrom.

The operation mechanism 50 comprises a control lever 52 pivotted to a pivot shaft 51 fixed to the side plate 12 of first side frame 1, a first swinging member 53 arranged inside the side plate 12 and having a shaft portion 53a extending through the side plate 12 and rotatably supported thereto, and a second swinging member 54 arranged outside the side plate 12 and supported non-rotatably to the shaft portion 53a so as to integrally swing with the first swinging member 53. The first swinging member 53 swingably supports the contact member 40 through pin 42. The lever 52 is provided with an association pin 55 for transmitting the motion of the lever 52 to the second swinging member 54 which is provided with a slot 54a for receiving the pin 55, so that the lever 52 is operated to swing the first and second swinging members 53 and 54 in association with each other, thereby causing the contacting and departing of the contact member 40 supported to the first swinging member 53 with respect to the rotary member 30. Additionally, the operation mechanism 50 includes an association mechanism acting in association with the clutch lever 81 for setting the clutch mechanism 6 in disengagement when the operation mechanism causes the contact member 40 to be set in position of contacting with the rotary member 30.

Figure 9:
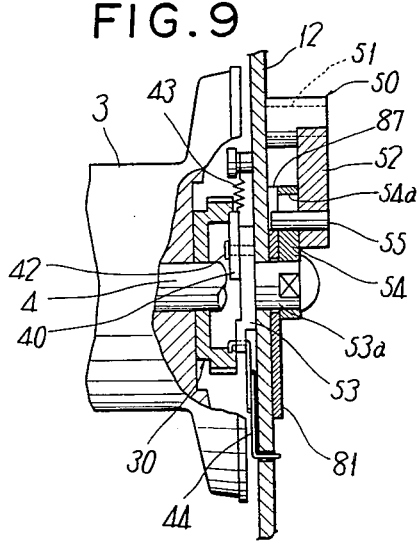
FIG. 9 is a sectional view taken on the line IX—IX in FIG. 7.
Figure 10:
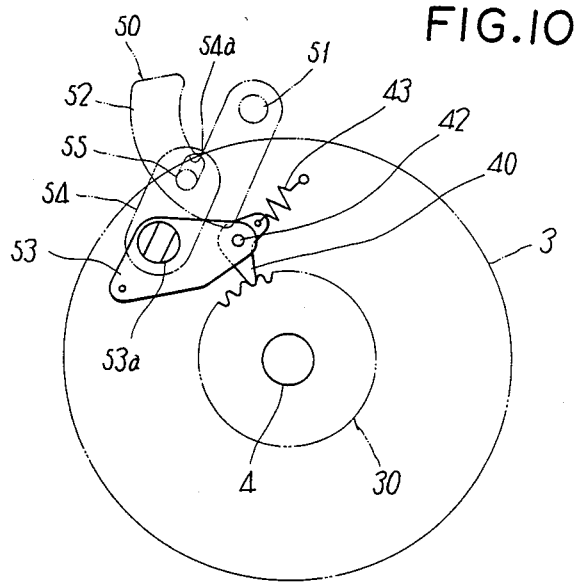
FIG. 10 is a side elevational view of a principal portion of the second embodiment.

The association mechanism in the embodiment shown in the drawings, particularly in FIG. 9, is so constructed that the association pin 55 is extended to project through the second swinging member 54, and the clutch lever 81 is provided with a slot 86 through which the shaft portion 53a passes, and a slant shoulder portion 87 interfering with the pin 55.

Referring to FIGS. 7 through 10, between the first swinging member 53 and side plate 12 is provided a torsion spring 44, and between the contact member 40 and side plate 12 is provided a coil spring 43, so that when the contact member 40 contacts with the rotary member 30, the pawl portion at the tip of contact member 40 is urged radially of the rotary member 30 and directed to the center thereof by use of the elasticity of the spring 43.

The spring force of the torsion spring 44 needs to be weaker than that of return spring 84 provided between the clutch lever 81 and side plate 12.

When the angler uses the reel of second embodiment constructed as just described, particularly when fishing for a black bass using a plastic worm, and after the casting operation, the clutch mechanism 6 is set to be in engagement for waiting for a pull of a fish. In this instance, the clutch lever 81 is positioned at the termination of its backward movement, and the control lever 52 is positioned at the position shown in FIG. 7, while the clutch mechanism 6 is in engagement, and the contact member 40 is disengaged from the rotary member 30. In this situation, when fish takes the worm causing the angler to feel the pull of the fish through his fingers in contact with the fishing line, the control lever 52 may be operated to move the pin 55 counter-clockwise in FIG. 7, so that the clutch lever 81 moves forward in association with and consequently to the movement of pin 55, thereby disengaging the clutch mechanism 6 so as to set the spool 3 in free rotation. Simultaneously, the first and second swinging members 53 and 54 swing clockwise in FIG. 7 through the pin 55, thereby allowing the contact member 40 pivotted to the first swinging member 53 to approach the rotary member 30, so that the pawl portion at the tip of the contact member 40 elastically engages with the rotary member 30 as shown in FIG. 8, thereby applying to the free rotation of the spool 3 a predetermined rotational resistance correspondingly to the spring force of spring 43 and simultaneously generating a sound.

When the first swinging member 53 swings clockwise at a predetermined angle, the torsion spring 44 changes its acting direction and acts reversely so as to urge the first swinging member 53 in the clockwise direction, so that the contact member 40 is kept in the contacting position with the rotary member 30.

Figure 7:
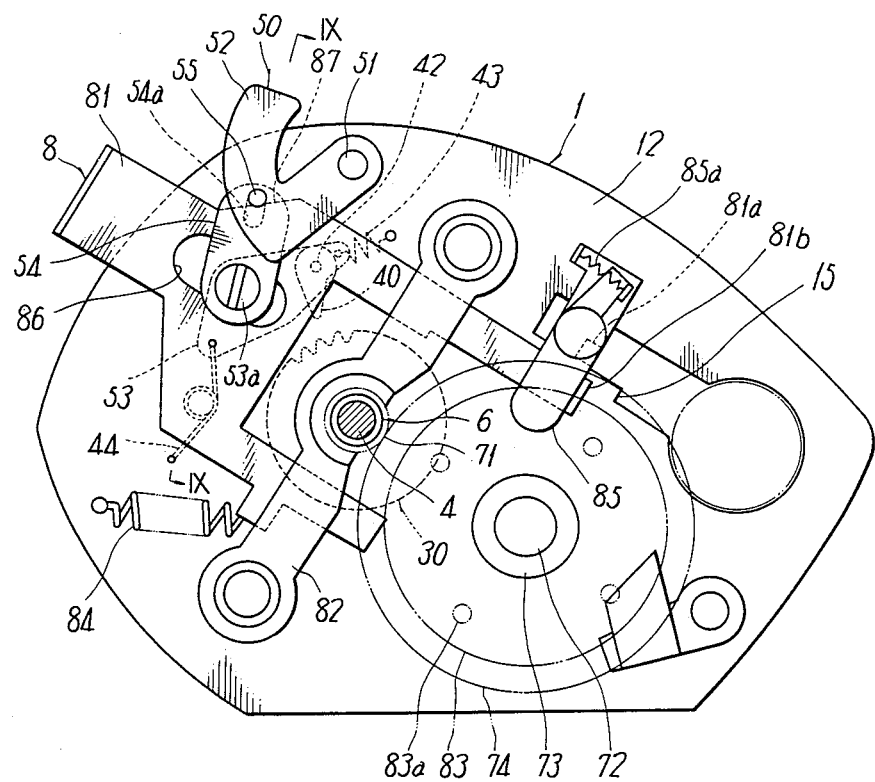
FIGS. 7 and 8 are partially omitted right side elevational views, in which the cover is removed, FIG. 7 showing a condition of the clutch mechanism in engagement and FIG. 8 showing a condition of the clutch mechanism in disengagement.
Figure 8:
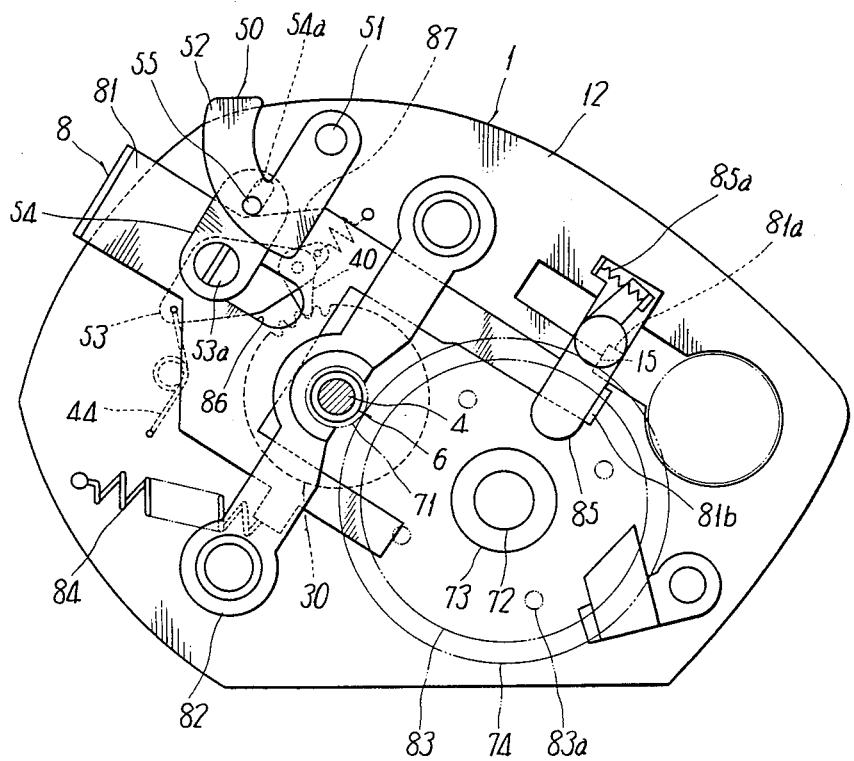

Then, when the fish takes the worm and is caught by the fishing hook, the handle 5 is immediately operated in rotation so as to move the clutch lever 81 backward toward the position as shown in FIG. 7 through the return spring 84, thereby setting the clutch mechanism 6 in engagement so as to connect the spool 3 with the driving mechanism, while the backward movement of clutch lever 81 allows the pin 55 at the control lever 52 to be urged by the shoulder portion 87 of the clutch lever 81, thereby revolving clockwise the lever 52 around the pivot shaft 51 supporting the lever 52 so as to swing counter-clockwise the swinging members 53 and 54 connected in association with the control lever 52 through the pin 55, thereby disengaging the contact member 40 from the rotary member 30. While, when the first swinging member 53 swings counter-clockwise at a predetermined angle, the torsion spring 44 changes again its acting direction and acts reversely so as to urge the first swinging member 53 in the counter-clockwise direction, so that the contact member 40 is kept in the departing position from the rotary member 30.

In the abovesaid construction, the clutch lever 81 when controlled can be operable independently of the control lever 52.

In the second embodiment, the coil spring 43 between the contact member 40 and side plate 12 may be replaced by any other elastic member having a different value of elasticity so as to change or adjust an applied rotational resistance to the spool 3 in free rotation.

The retaining position of the coil spring 43 to the side plate 12 may be changed to change or adjust the applied rotational resistance to the spool.

In the second embodiment, the contact member 40 carries the pawl 41, and the coil spring 43 is provided between the contact member and side plate 12. Alternatively, the contact member may be formed from a leaf spring so as to eliminate the coil spring 43.

In the second embodiment, the rotary member 30 is provided at the outer peripheral portion with teeth so as to form a gear. Alternatively, the rotary member 30 may be, for example, formed in a disc-like shape from a material, for example, such as rubber and the like having a larger frictional factor, so that a contact resistance by the contact member 40 allows the spool 3 in free rotation to be subjected to a predetermined rotational resistance.

In the second embodiment, the spool 3 is set in free rotation through the clutch lever 81 by operation of control lever 52. Alternatively, the spool may be set in free rotation in such a manner that a separate control member for controlling the clutch yoke 82 other than the clutch lever 81 is provided and made associated with the control lever 52.

As seen from the above, according to the described embodiments, the spool 3 can be set in free rotation through operation of the control lever 52 and the free rotation of the spool is, simultaneously and automatically subjected to a predetermined rotational resistance. Hence, when the angler fishes for black bass by use of a plastic worm, for example, and feels a pull of the fish, he can smoothly feed out the fishing line without causing a backlash through an extremely simple operation of the control lever 52. Thus, the reel with the foregoing features of the invention can be readily used by a beginning angler.

Additionally, in case there is no need to apply the rotational resistance to the free rotation of the spool 3, the control lever 52 may be operated, resulting in that the control lever 52 and clutch lever 81 may be selectively used corresponding to fishing situations and circumstances.

While preferred embodiments of the invention have been described using specific terms, such description is for illustration purpose only, and it is to be understood that changes and variations may be made without departing from the spirit or scope of the following invention which is defined in the claims.

What is claimed is:

1. A fishing reel comprising:
(a) a reel body including first and second spaced side frames;
(b) a spool having a spool shaft rotatably supported to said side frames at said reel body;
(c) a driving mechanism supported to said first side frame for driving said spool shaft;
(d) a clutch mechanism for coupling said spool shaft to said driving mechanism for driving rotation thereof and for uncoupling said spool shaft from said driving mechanism to permit its free rotation;
(e) a clutch control mechanism, including a clutch operating lever having an operating portion projecting beyond an outer radial extremity of said first side frame such that said operating portion is operable from outside said outer radial extremity to control said clutch mechanism, said clutch lever being reciprocable transversely relative to said spool shaft;
(f) a rotary member connected to rotate with said spool;
(g) a contact member for contacting with and departing from said rotary member, said contact member contacting with said rotary member to apply a resistance to rotation of said spool shaft; and
(h) an operation mechanism supported to said first side frame and operating said contact member between a contacting position and a departing position with respect to said rotary member, said operation mechanism comprising an operation lever pivoted to said first side frame at a first pivot axis, at least one swinging member which is pivoted to said first side frame at a second pivot axis and which swings in response to movement of said operation lever to control the positioning of said contact member, and an association mechanism provided between said clutch lever and one of said operation lever and said swinging member, said association mechanism engaging with said clutch lever for moving said clutch lever to set said clutch mechanism in a condition of uncoupling said spool shaft from said driving mechanism when said swinging member sets said contact member to contact with said rotary member, said association mechanism being supported to one of said operation lever and said swinging member, said clutch lever being operable independently of said operation lever to disengage said clutch mechanism such that said clutch mechanism can be operated without causing movement of said operation lever and said operation lever can be operated (i) to cause said clutch lever to disengage said clutch mechanism and (ii) substantially simultaneously to position said contact member to contact said rotary member.

2. A fishing reel according to claim 1, wherein said rotary member is provided at its outer periphery with a number of ridges and grooves, and said contact member is formed as a sound-generating pawl for generating sound by contacting with said ridges and grooves at said rotary member.

3. A fishing reel according to claim 1, wherein said association mechanism is formed from an association pin engaging with a shoulder portion at said clutch lever.

4. A fishing reel according to claim 3, wherein said swinging member is coupled to a torsion spring for holding said contact member at a contacting position and a departing position with respect to said rotary member.

5. A fishing reel according to claim 1, further comprising means responsive to actuation of said drive mechanism for causing said clutch mechanism to couple said spool shaft to said driving mechanism and for causing said clutch lever to engage with said association mechanism to move said swinging member away from contact with said rotary member.

* * * * *